Dec. 8, 1953  C. R. A. GRANT  2,661,625
PROTECTIVE CONNECTOR FOR PRESSURE GAUGES
Filed June 27, 1952
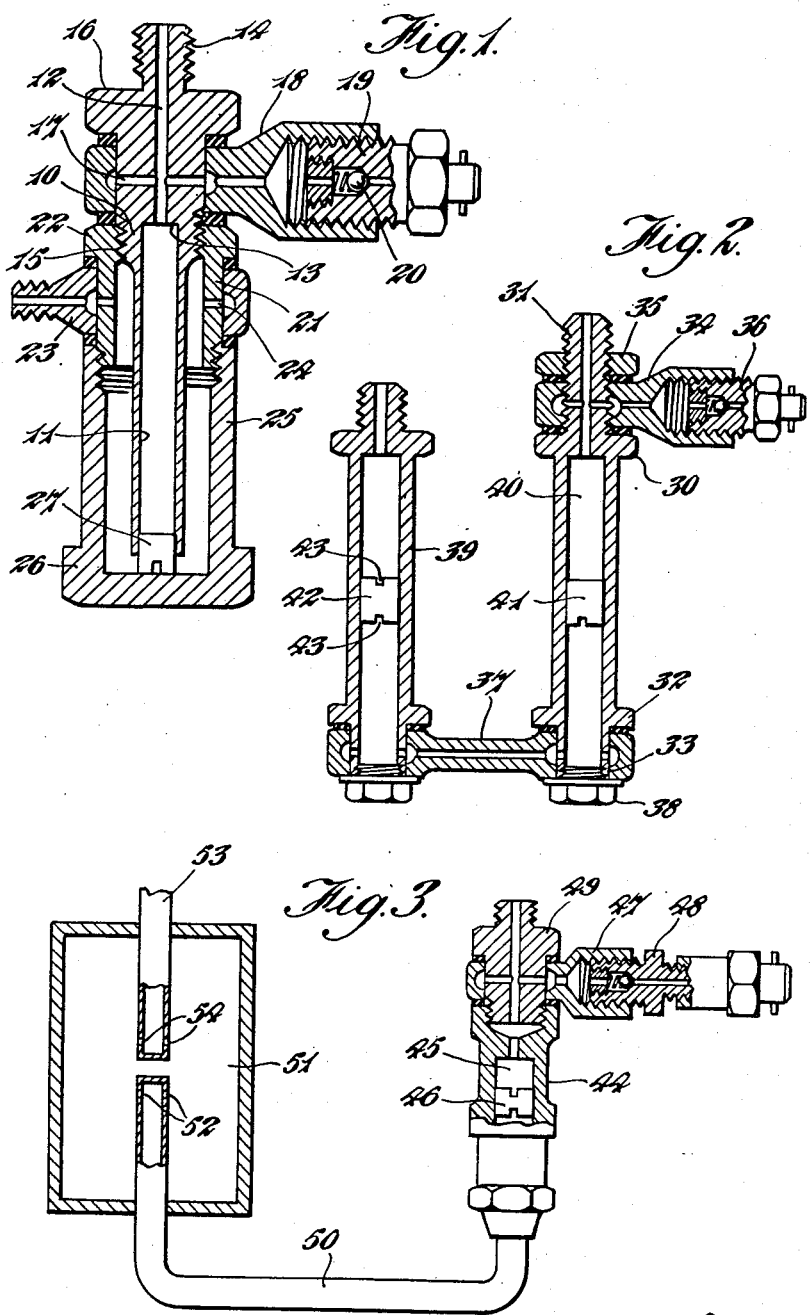

Patented Dec. 8, 1953

2,661,625

UNITED STATES PATENT OFFICE 2,661,625

PROTECTIVE CONNECTOR FOR PRESSURE GAUGES

Charles R. A. Grant, London, England, assignor of one-half to Pressure Gauges Limited, Dublin, Ireland, an Irish company Application June 27, 1952, Serial No. 296,039

2 Claims. (Cl. 73—389)

1

This invention relates to connections for pressure gauges, and has for its object to provide a connection by means of which a pressure gauge can be connected to a gas pressure system without danger of substantial leakage of gas from the system in the event of damage to the gauge.

The specification of my application for British Patent No. 5087/49 and of my application for U. S. patent, S. N. 154,916 filed April 19, 1950, describes a pressure gauge connection for connecting a pressure gauge to a liquid pressure system in such a way that the gauge is at all times responsive to the pressure in the system, but failure of the gauge resulting in leakage of liquid therefrom does not cause any substantial leakage of liquid from the system.

The present invention provides a similar connection for use with a gas pressure system.

According to the invention, in a gauge connection for connecting a pressure gauge to a gas pressure system the gas pressure is transmitted to the gauge through a column of liquid in which there is interposed an obturating member, the said obturating member being carried by the said liquid, in the event of failure of the gauge, to a position in which it closes, or substantially closes, the said connection.

The obturating member may comprise a piston movable in a cylinder, the piston, in the position to which it is carried in the event of failure of the gauge, defining between a surface thereon and a surface of the cylinder, a very highly restricted leakage path between the cylinder and the gauge.

The column of liquid may be contained in a vertical cylinder connected at its upper end to the gauge, and at its lower end to a liquid chamber below the level of liquid in said chamber, the chamber being connected, above the level of the liquid therein, to the gas pressure system.

The invention is hereinafter described with reference to the accompanying drawings, in which:

Figure 1 is a longitudinal section through one form of gauge connection according to the invention;

Figure 2 is a similar longitudinal section through another form of gauge connection according to the invention; and Figure 3 shows another arrangement according to the invention.

2

Figure 1 shows a gauge connection unit comprising a tubular stem 10 open at both ends, the bore of the stem having a lower portion 11 which is of larger diameter than the upper portion 12 thereof, the two portions of the bore meeting at a flat shoulder 13. The stem 10 is screw-threaded externally at 14 at its upper end for the connection thereto of a pipe leading to a pressure gauge, and has a second screw-threaded portion 15 below a hexagonal portion 16, the part of the stem below the portion 15 being plain. The screw-threaded portion 15 is drilled radially at 17 to provide communication between the upper portion 12 of the bore in the stem and the interior of a banjo adaptor 18 fitting over the stem, the banjo adaptor having screwed into its side connection a filling plug 19 adapted at its outer end to receive an oil gun, and having the passage therethrough controlled by a non-return valve 20. The banjo adaptor 18 is clamped in position by a sleeve 21 which is screw-threaded internally to engage the screw-thread 15, and has a hexagonal flange 22 at its upper end. A second banjo adaptor 23 fits over the sleeve 21, radial ports 24 in the sleeve being provided to connect the said adaptor with the interior of the sleeve, and this banjo adaptor is held in position by a cylindrical cup-like well 25 which is screw-threaded internally at its upper end to engage an external screw thread on the sleeve 21. The well 25 has a hexagonal flange 26 at its lower end. The lower end of the stem 10 is positioned slightly above the bottom of the well 25. The side connection of the banjo adaptor 23 is connected to the gas pressure system the pressure in which is to be indicated by the pressure gauge. A piston 27 is mounted in the lower portion 11 of the bore of the stem, the piston 27 being a sufficiently loose fit to allow a very slight leakage of liquid past it, and is provided on its upper end face, which is formed flat and truly perpendicular to the axis of the piston, with one or more projections of a height not exceeding fifteen ten-thousandths of an inch which engage the shoulder 13 when the piston is urged upwardly to the limit of its travel, thus providing a clearance equal to the height of the said projections between the shoulder and the end of the piston. This clearance is smaller than the annular clearance around the piston.

Before the unit is connected to the gas pressure system and the gauge, oil is fed into it through the plug 19 until both the bore of the stem 10 and the well 25 are full, the escaping of oil from the upper end of the stem 10 and from the banjo adaptor 23 providing an indication that sufficient oil has been supplied. The connections to the gauge and to the system are then made.

Gas pressure in the system is applied to the oil in the well 25, and through the oil to the pressure gauge, which thus indicates the pressure in the system.

If the pressure gauge develops a leak, there will be a fairly rapid movement of the liquid upwardly in the stem, which will carry the piston 27 upwardly until it engages the shoulder 13, and establishes a very highly restricted leakage path through the clearance between its end face and the shoulder. A very small quantity of liquid then passes through the said leakage path, but it has been found that such leakage soon ceases, due, it is believed, to the progressive building up of static layers of liquid on the surfaces bounding the leakage path, a phenomenon which is well known in connection with flow restrictors. It is found that leakage is liable to re-commence if the pressure conditions in the system are disturbed, so that when the gauge is repaired or replaced, operation of the system will cause liquid to pass the piston 27 and allow it to move away from the shoulder, thus restoring normal operation of the gauge. When the piston 27 is spaced from the shoulder 13, liquid can flow past it to a small extent, thus ensuring that liquid is not trapped in the gauge so as to cause an inaccurate reading.

The piston 27 may be replaced by a ball or other element which seats in a completely leak-proof manner on the shoulder 13, but is of such a diameter as to allow relatively free passage of liquid past it in the bore of the stem 10 when it is not seated, the ball or other element being carried on to its seat by the initial rush of liquid when the gauge fails. With such an arrangement it is necessary to supply additional liquid through the plug 19 when a new gauge is fitted, to force the ball or other element off its seat.

In the arrangement shown in Figure 2, the cylinder in which the controlling piston is mounted comprises a tube 29 having an externally screw-threaded portion at its upper end, and an internally screw-threaded portion at its lower end, a hexagonal flange 30 between the screw-threaded portion 31 at the upper end of the tube and the central part of the tube, and a circular flange 32 between the screw-threaded portion 33 at the lower end of the tube and the central part of the tube. A banjo adaptor 34 is fitted over the portion 31 of the tube and clamped by a nut 35, the adaptor 34 carrying a filling plug 36. A double banjo adaptor 37 is secured at one of its ends to the lower end of the tube 29 by a screw-threaded plug 38, the other end of the adaptor 37 being similarly secured to a second tube 39 extending upwardly alongside the tube 29 and adapted for connection, at its upper end, to a gas pressure system. The upper end of the tube 29 is adapted for connection to a pressure gauge.

The tube 29 has a stepped bore 40 similar to that of the stem 10 described with reference to Figure 1, and houses a similar piston 41. A floating piston 42 is mounted in the tube 39, and is a sufficiently free fit in the bore to allow slow movement of liquid past it. The movement of the piston 42 is limited by shoulders at the ends of the bore, the ends of the piston being grooved diametrally as shown at 43 to prevent the closing of the passage through the tube when the piston is in engagement with either shoulder. The piston 41 is similarly grooved at its lower end, for the same purpose.

This arrangement operates in the same way as that described with reference to Figure 1, the piston 42 serving to prevent any large degree of mixing of the air and liquid.

Figure 3 shows a connection similar to that described and illustrated in my patent application No. 5087/49, in combination with an additional unit which renders it suitable for use with a gas pressure system. The connection comprises a body 44 in which is formed a cylinder 45 to receive the floating piston 46, the piston having a clearance in the cylinder of not more than fifteen ten-thousandths of an inch, and being grooved diametrally at its ends. A banjo adaptor 47 carrying a filling plug 48 is clamped to the top of the body 44 by a drilled plug 49 which also serves for connecting the cylinder 45 to a pressure gauge. The lower end of the cylinder is connected, by a conduit 50, to a closed chamber 51, the conduit 50 extending upwardly into the chamber 51 and having lateral orifices 52 opening into the said chamber near the middle of the latter. A second conduit 53 extends downwardly into the chamber 51, and has orifices 54 therein which also open into the chamber 51 near the centre of the latter.

In use, the chamber 51 and cylinder 45 are filled with liquid, the chamber conveniently being filled by removing the conduit 53 and pouring liquid through the orifice into which it fits. The pressure in the gas pressure system is transmitted to the gauge through the liquid, and, as the orifices 52 in the conduit 50 are always immersed in the liquid in the chamber, there is no danger of air entering the said conduit 50 and reaching the cylinder 45, even if the chamber 51 is steeply inclined or inverted.

Positively closing obturating members may be provided in the arrangements shown in Figures 2 and 3, instead of the pistons described.

I claim:

1. A gauge connection for connecting a pressure gauge to a gas pressure system comprising a first vertical cylinder, means to connect the upper end of the said cylinder to the pressure gauge, a second vertical cylinder disposed with its lower end substantially level with the lower end of said first cylinder, means to connect the lower ends of said cylinders one to the other, means to connect the upper end of said second cylinder to the gas pressure system, an obturating member movable in said first cylinder, a seat for said obturating member at the upper end of said first cylinder, a floating piston movable in said second cylinder, and liquid filling said first cylinder and at least the part of the second cylinder below the floating piston.

2. A gauge connection for connecting a pressure gauge to a gas pressure system comprising first and second vertical cylinders, external flanges on said cylinders adjacent their lower ends, a connecting member having openings to receive the lower ends of said cylinders, flanged screw plugs closing the lower ends of said cylinders, said connecting member being clamped between the flanges on said cylinders and the flanges in said plugs, a passage in said connecting member, parts in said cylinders opening into said passage, internal shoulders at the upper ends of said cylinders, means for connecting the upper end of one of said cylinders to a pressure gauge, means for connecting the upper end of the other of said cylinders to a gas pressure system, a floating piston in said one cylinder having a substantially flat upper end face and a diametral groove in its lower end face, and a floating piston in said other cylinder having diametral grooves in both its upper and lower end faces, both of said floating pistons fitting in a non-liquid-tight manner in their respective cylinders.

CHARLES R. A. GRANT.

References Cited in the file of this patent

UNITED STATES PATENTS

| Number | Name | Date |
| --- | --- | --- |
| 1,422,485 | Shephard | July 11, 1922 |
| 1,898,257 | Nelson | Feb. 21, 1933 |
| 2,313,610 | Yowell | Mar. 9, 1943 |

FOREIGN PATENTS

| Number | Country | Date |
| --- | --- | --- |
| 182,877 | Great Britain | of 1922 |
| 744,502 | France | of 1933 |